(No Model.) 2 Sheets—Sheet 2.

J. T. HAMBAY.
SPEED CHANGING GEAR.

No. 552,124. Patented Dec. 31, 1895.

WITNESSES

INVENTOR

UNITED STATES PATENT OFFICE.

JAMES T. HAMBAY, OF BOSTON, MASSACHUSETTS.

SPEED-CHANGING GEAR.

SPECIFICATION forming part of Letters Patent No. 552,124, dated December 31, 1895.

Application filed May 23, 1894. Serial No. 512,232. (No model.)

*To all whom it may concern:*

Be it known that I, JAMES T. HAMBAY, of Boston, in the county of Suffolk and State of Massachusetts, have invented a new and useful Improvement in Speed-Changing Gears, of which the following, taken in connection with the accompanying drawings, is a specification.

My invention relates to a device to be used on mechanisms in which it is desirable to be able to change the relative speed as transmitted from the driving device to the wheel driven; and it consists in a peculiar combination and arrangement of gears, the exact nature of which may be but understood from the specification and accompanying drawings, the object being to construct a simple and compact device which can be applied to mechanism in use and occupy but little space. This object I attain by means of the mechanism shown in the accompanying drawings, in which—

Figure 5:
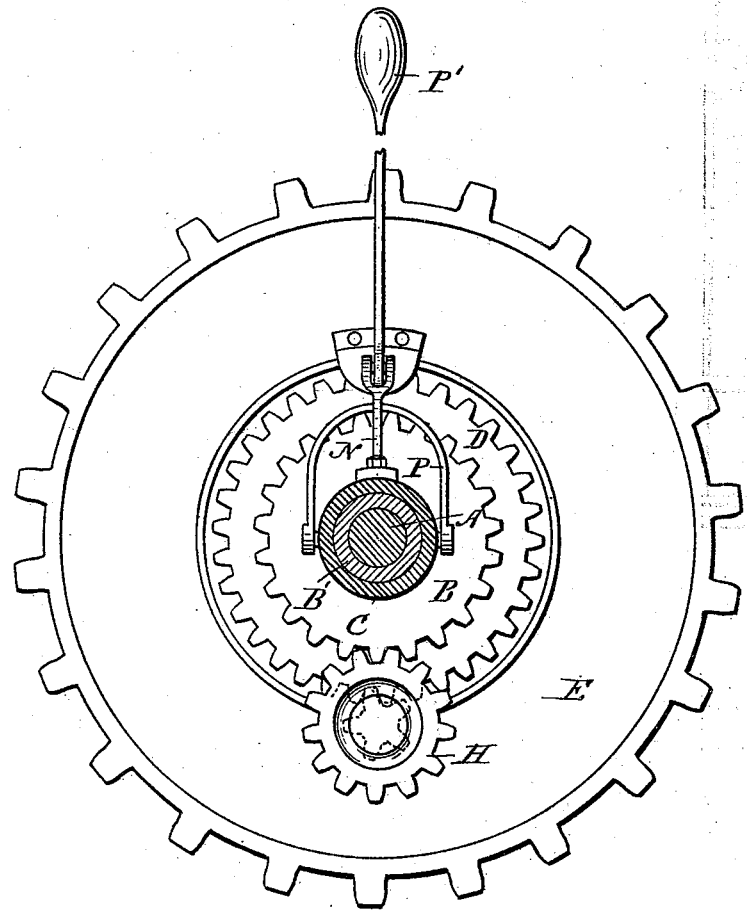
Figure 4:
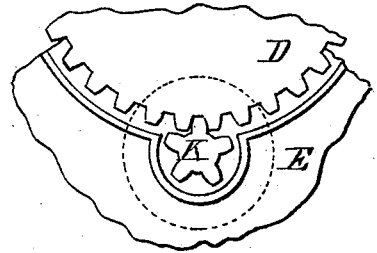

Figure 1 is a perspective view of my invention. Fig. 2 is a view of the same partly in side elevation and partly in vertical section. Fig. 3 is an elevation of a detail. Fig. 4 shows certain parts and their relation to each other. Fig. 5 is a view showing most of the parts of my invention in elevation, the shaft and hollow shafts being shown in cross-section.

In the drawings I have shown my invention as it appears when used in connection with a sprocket-wheel, but it may be applied to various forms of mechanism with good results.

Let A represent a shaft properly mounted in a framework to which the hollow part C is attached. A' is a crank rigidly attached to the shaft A. The spur gear-wheel D is also rigidly attached to the shaft A, and consequently must rotate with it and the crank A'. The sprocket-wheel E is adapted to turn independently of the gear-wheel D and freely upon the shaft A.

The sprocket-wheel E has two flanged recesses, the larger one of which is concentric with the wheel and is adapted to receive the gear D. The other flanged recess is smaller and is located outside of the larger one, but opens into it, as shown in Fig. 4, and is adapted to receive the gear-wheel K, and forms an internal bearing in which the said gear-wheel K turns and engages with the gear-wheel D.

The gear-wheel B is mounted upon a hollow arbor B', which turns and slides loosely upon the shaft A, or it may be mounted upon the main shaft. This wheel B is made to slide by means of the lever P', which is pivoted at N' to an arm N attached to the framework C, as shown. The lever P' has two arms P and P², each of which is provided with a pin or swivel-piece adapted to work in an annular groove formed as shown in the hub of the gear-wheel B, so that by moving the lever P' the gear-wheel B may be moved so as to rest against the wheel D, in which case it engages with the clutch-pin R, which is fixed in the web of the gear-wheel D, Fig. 2, and cannot turn except with the wheel D, or it may be moved back so that its hub B² may form a clutch engagement with the fixed part C C', in which case it cannot turn at all, but remains stationary.

The two small gears K and H (see Figs. 2 and 3) are fastened together or made in one piece. The part K of the double gear K H runs in a circular flanged recess (as a bearing) made for it on the disk of the sprocket-wheel E (see Figs. 3 and 4) and is held in said recess by a washer L and the screw L'. The gear-wheel H engages with the gear B, and the gear K engages with the gear D, as shown in Fig. 2.

It will be observed that the gear K does not run on central bearings, but is inclosed in a recess formed for it in the web of the sprocket-wheel E. This fact is shown in Figs. 3 and 4.

A pin R, Fig. 2, is fixed in the web of the gear-wheel D and serves to engage with a hole made for it in the gear-wheel B, and thus lock the two together, when the said wheel B is moved up to the wheel D, as shown in Fig. 2.

The operation of my invention may be explained as follows: If we suppose that the gear-wheel B is engaged with the gear-wheel D by the pin R, then there can be no relative motion between them, and the double gear K H, being engaged with both B and D, cannot rotate, so that if the crank A' is turned all of the parts, including the sprocket-wheel E, must turn with it the same as though all (No Model.)
W. HERRMAN.
CAR SIGNAL.
No. 552,125. Patented Dec. 31, 1895.
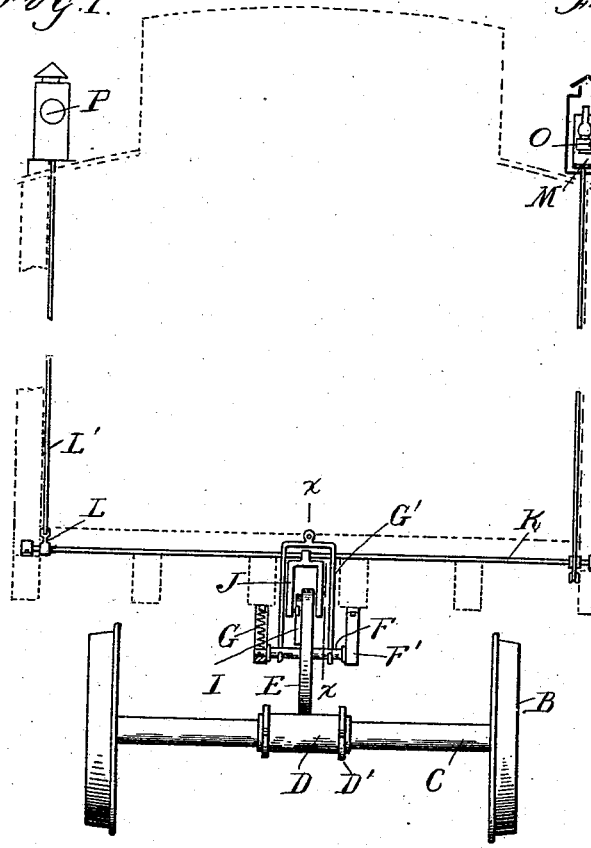
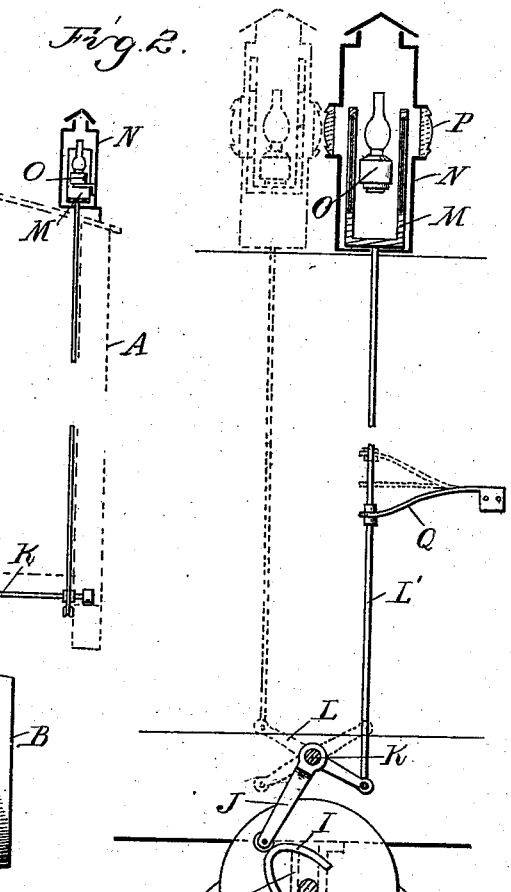
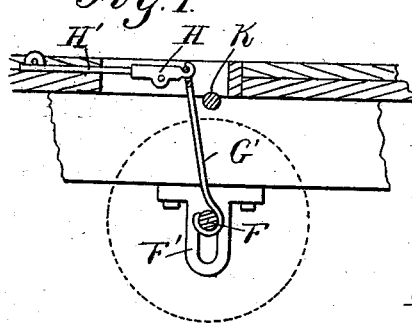
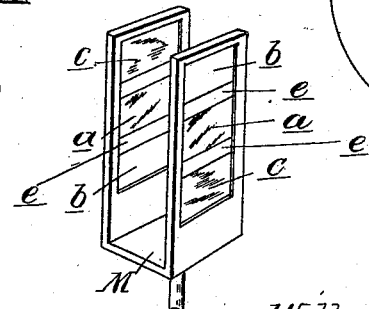
Witnesses
A. L. Mabby
L. J. Whittemore
Inventor
William Herrman
By Thos. S. Sprague & Son
Attorneys